(12) United States Patent
Murray

(10) Patent No.: US 7,114,726 B2
(45) Date of Patent: Oct. 3, 2006

(54) PRESSURIZED CHAMBER SEAL CARTRIDGE

(75) Inventor: James Daniel Murray, Atholville (CA)

(73) Assignee: AV Cell Inc., Atholville (CA)

( * ) Notice: Subject to any disclaimer, the term of this patent is extended or adjusted under 35 U.S.C. 154(b) by 171 days.

(21) Appl. No.: 10/647,133

(22) Filed: Aug. 25, 2003

(65) Prior Publication Data
US 2005/0110220 A1   May 26, 2005

Related U.S. Application Data

(63) Continuation of application No. PCT/CA02/00259, filed on Feb. 28, 2002.

(51) Int. Cl.
F16J 15/46   (2006.01)

(52) U.S. Cl. .................... 277/549; 277/510; 277/628

(58) Field of Classification Search ............ 277/510, 277/628, 549–553
See application file for complete search history.

(56) References Cited

U.S. PATENT DOCUMENTS

| | | | |
|---|---|---|---|
| 4,730,656 A * | 3/1988 | Goodell et al. | ............. 152/417 |
| 5,069,461 A | 12/1991 | Orlowski | |
| 5,117,743 A | 6/1992 | Yuda | |
| 5,180,297 A | 1/1993 | Hansen et al. | |
| 5,217,234 A | 6/1993 | Hornsby | |
| 5,294,132 A | 3/1994 | Duffee et al. | |
| 5,312,116 A | 5/1994 | Quaglia | |
| 5,409,240 A | 4/1995 | Ballard | |
| 5,499,902 A | 3/1996 | Rockwood | |
| 5,558,491 A | 9/1996 | Andrews | |
| 5,713,578 A | 2/1998 | Terao et al. | |
| 5,716,054 A | 2/1998 | Duffee et al. | |
| 5,727,792 A | 3/1998 | Rockwood | |
| 5,823,541 A * | 10/1998 | Dietle et al. | ............. 277/320 |
| 6,302,405 B1 | 10/2001 | Edwards | |
| 6,406,216 B1 | 6/2002 | Raasch | |

OTHER PUBLICATIONS

"Seals and Sealing Handbook" by M. Brown, 4th Edition, 1995, ISBN # 1 84617 232 5.

"Mechanical Seals and Sealing Systems Handbook", vol. 3 of "Pump Handbook" published in 1999 by AES Marketing Inc., available on internet at: http://www.pump-zone.com/handbook/handbook.htm.

* cited by examiner

Primary Examiner—Frederick L. Lagman
(74) Attorney, Agent, or Firm—Bereskin & Parr

(57) ABSTRACT

A seal cartridge for a centrifugal pump includes a housing that fits within a conventional stuffing box of the pump and has a cylindrical internal surface receiving the shaft. A pair of annular grooves are provided internally of the housing adjacent respectively opposite ends thereof. Each groove receives an O-ring that runs in contact with the sleeve when the shaft rotates. The sleeve, housing and O-rings define an annular chamber through which water is circulated to cool and lubricate the O-rings. The water is pressurized to cause the O-rings to deform and seal against the sleeve.

14 Claims, 3 Drawing Sheets

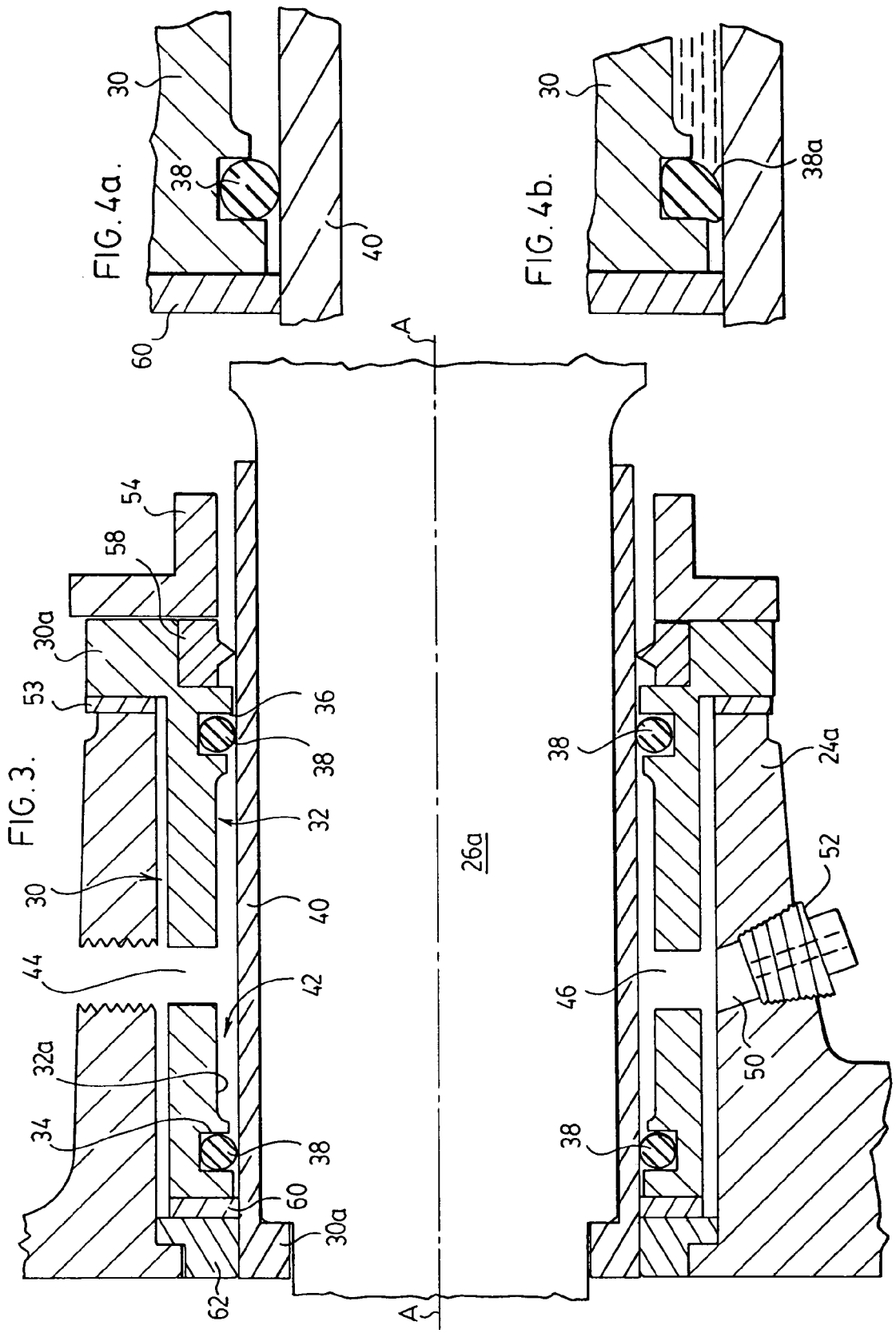

PRESSURIZED CHAMBER SEAL CARTRIDGE

FIELD OF THE INVENTION

This invention relates generally to seals for rotary shafts, and to methods of sealing rotary shafts.

BACKGROUND OF THE INVENTION

The invention has been devised primarily in the context of (but is not limited to) seals for centrifugal pumps. A typical centrifugal pump includes an impeller that rotates in a pump chamber to draw liquid into the chamber through a central inlet and direct the liquid radially outwardly by centrifugal force to an outlet at the periphery of the chamber. The impeller is mounted at one end of a rotary drive shaft that extends outwardly through a housing that defines the pump chamber. Externally of the chamber, the shaft is supported in bearings and is coupled to a suitable drive motor. A seal is provided where the shaft extends through the housing defining the pump chamber.

Conventionally, two alternative types of seal have been employed, namely a traditional so-called pump "packing" or a composite mechanical seal. A traditional pump packing includes a housing into which packing rings are inserted and then compressed by means of a packing gland so that the rings seat snugly against the shaft. A mechanical seal involves a complex assembly of seal components that co-operate with one another to provide the required sealing effect. This type of seal is quite expensive both in terms of capital cost and initial set-up time and complexity.

Seals deteriorate rapidly in pumps that are used in harsh environments such as for pumping acid in paper mills. The seals must be replaced at frequent intervals, and the pump must be shut down each time. This is costly not only in terms of direct maintenance cost, but also in terms of pump down time.

DESCRIPTION OF THE PRIOR ART

The prior art includes the following literature references:
1. "Seals and Sealing Handbook" by M. Brown, 4th Edition, 1995, ISBN # 1 85617 232 5.
2. "Mechanical Seals and Sealing Systems Handbook", volume 3 of "Pump Handbook" published in 1999 by AES Marketing Inc. (Flach).

Brown discloses the use of O-rings as rotary seals but suggests that O-rings should not be used at surface speeds greater than about 200 ft/min. Flach discloses double seals or tandem seals and the use of pressurized barrier fluid.

SUMMARY OF THE INVENTION

An object of the present invention is to provide a seal for a rotary shaft that offers a number of advantages compared with the prior art.

The seal provided by the invention includes a housing for receiving the shaft, the housing having a generally cylindrical internal surface and first and second internal annular grooves that are spaced longitudinally of and encircle the internal surface of the housing. Each groove receives an O-ring for contact with the external surface of the shaft and against which the shaft rotates in use. The housing has fluid inlet and outlet ports which extend through the housing and into the generally cylindrical internal surface of the housing at locations spaced angularly about the housing and between the O-rings. When a shaft is received in the housing, an annular chamber is defined between the shaft and the housing and between the O-rings and a fluid can be circulated under pressure through the chamber via the ports. The O-rings are deformable under the pressure of the fluid to seal against the shaft.

The fluid that is circulated through the chamber (typically water) has a cooling and lubricating effect on the seal as a whole and in particular on the O-rings. It is believed that this effect protects the O-rings against failure due to abrasion by the shaft. At the same time, the fact that the O-rings deform ensures a good seal.

The housing and O-rings together form a cartridge. When the cartridge is installed on a shaft and charged with liquid, it becomes a "Pressurized Chamber Seal Cartridge".

The invention also provides a method of sealing a rotary shaft which comprises the steps of: providing a seal that has a housing with a generally cylindrical internal surface for receiving the shaft, the shaft and the generally cylindrical internal surface of the housing defining an annular chamber between respective deformable O-rings that are spaced longitudinally of and encircle the housing and are received in corresponding internal grooves in the housing; and circulating through said chamber a fluid under pressure to cause the O-rings to deform to seal against the rotary shaft.

Preferably, the cylindrical surface of the housing includes a radially enlarged surface portion between the O-rings, so that the chamber has a greater radial extent than the radial space between the shaft and the housing outwardly of the O-rings.

BRIEF DESCRIPTION OF THE DRAWINGS

In order that the invention may be more clearly understood, reference will now be made to the accompanying drawings which illustrate a particular preferred embodiment of the invention by way of example, and in which:

FIG. 3 is an enlarged view of the seal as shown in FIG. 1; and,

FIG. 4 comprises detail views denoted (a) and (b) showing one of the O-rings of the seal respectively before and after the O-ring is subjected to the effect of pressurized fluid in use.

DESCRIPTION OF PREFERRED EMBODIMENT

Figure 1:
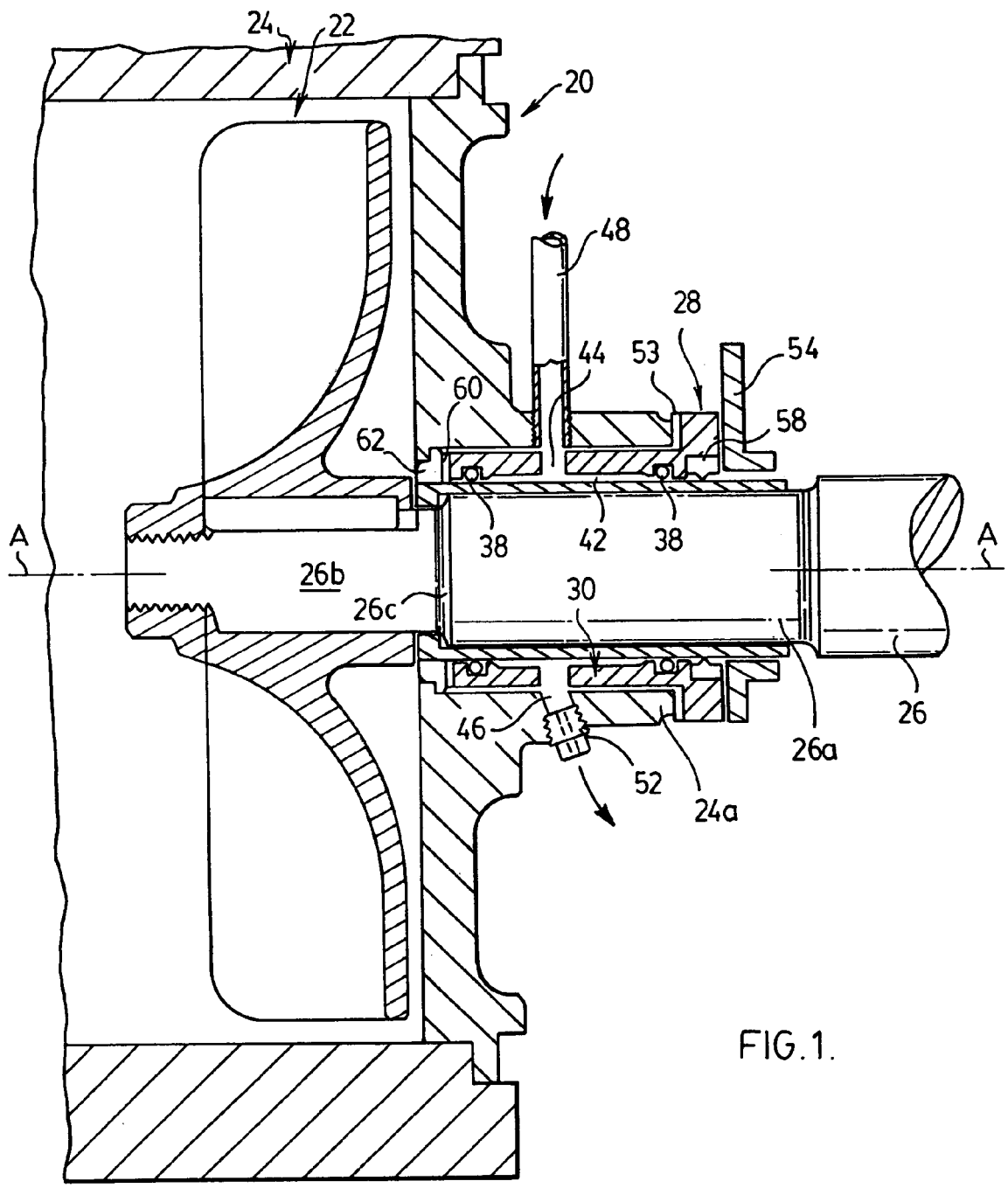
FIG. 1 is a longitudinal sectional view through part of a centrifugal pump, including the impeller drive shaft of the pump, and showing a seal in accordance with the invention on the drive shaft.

Referring first to FIG. 1, a conventional centrifugal pump is generally indicated by reference numeral 20 and includes a impeller 22 that is supported in a housing 24 for rotation about a longitudinal axis A-A. The impeller 22 is designed to draw liquid centrally into the housing 24 and expel the liquid generally radially with respect to axis A-A in accordance with known centrifugal pump design.

Impeller 22 is carried at one end of a drive shaft 26 which extends outwardly through housing 24 to the right in FIG. 1, where it is supported in bearings and coupled to a drive motor for rotating the shaft about axis A-A. Since the pump itself is entirely conventional, specific details of the pump, drive shaft bearings and drive motor have not been shown.

The invention provides a seal cartridge that is mounted on the drive shaft 26 to seal against leakage of the liquid being pumped along the drive shaft from housing 24. The seal cartridge is generally denoted 28 in FIG. 1. It can be seen that drive shaft 26 includes axial portions denoted 26a and 26b that are of progressively reducing diameter in a direction towards impeller 22. Again, this is in accordance with conventional centrifugal pump design criteria. Seal cartridge 28 co-operates with the intermediate portion 26a of drive shaft 26. In fact, the seal cartridge is received in a cylindrical extension 24a of the pump casing 24 that extends outwardly of the casing in a direction away from impeller 22 and that traditionally is known as a "stuffing box". Again, this is in accordance with conventional pump design.

Seal cartridge 28 is shown in more detail in FIG. 3 in association with the portion 26a of shaft 26. The cartridge includes a housing 30 that has a generally cylindrical internal surface 32 which receives the shaft 26. Surface 32 includes first and second internal annular grooves 34, 36 that are spaced longitudinally of and encircle the housing adjacent respectively opposite ends thereof. Each groove receives an O-ring 38 that seals against the drive shaft. In this particular embodiment, a sleeve 40 is pressed or shrunk onto the portion 26a of drive shaft 26 so as to rotate with the drive shaft and in effect provide a protective surface on the drive shaft against which the O-rings 38 can seal. In other words, sleeve 40 provides a sacrificial, replaceable surface on the drive shaft so that the drive shaft is preserved even if the seal should fail and cause damage to the external surface of sleeve 40.

Between the two grooves 34 and 36, the internal surface 32 of housing 30 is radially enlarged as indicated at 32a to in effect provide an enlarged chamber 42 between the seal housing 30 and the external surface of sleeve 40. The clearance between housing 30 and sleeve 40 may be about 0.060" (60 thousandths of an inch) at the ends of the housing and about 0.125" (125 thousandths of an inch) in chamber 42. Fluid inlet and outlet ports 44 and 46 respectively extend through housing 30 and open into the generally cylindrical internal surface 32 of housing 30, where they communicate with chamber 42. The inlet and outlet ports 44 and 46 are spaced angularly about housing 30 (in this case diametrically spaced) and are located between the O-rings 38 so that a fluid can be circulated under pressure through the chamber 42.

The O-rings 38 are designed to be deformable under the pressure of the fluid in chamber 42 so as to firmly seal against sleeve 40. FIG. 4 illustrates how the O-rings deform under pressure. As seen in FIG. 4(a) the O-ring 38 is in its normal circular section configuration. In FIG. 4(b) on the other hand, pressurized fluid is present in chamber 42 and the O-ring 38 is shown as having deformed as indicated at 38a under the effect of that pressure to seal firmly against sleeve 40.

The materials, dimensions and other parameters given below relate to a practical example of a seal cartridge for centrifugal pumps such as might be used in a paper mill, and may vary depending on the particular application in which the seal is used.

In this example, the O-rings are made of a fluorocarbon rubber based compound having a working temperature range of 20° F. to 400° F.

It is self-evident that the O-rings must be properly sized to assure proper contact and maintain proper sealing with the shaft. Preferably, the overall internal diameter of the O-ring is slightly undersize with respect to the diameter of the shaft (sleeve 40). Typically, the O-ring may be 0.005 inches (5 thousandths of an inch) undersize. The diameter of the cross-section of the O-ring may also vary according to shaft size. Typical examples may be as follows:

| Shaft Size | O-Ring Diameter (Cross-Section) |
|---|---|
| 1.250" | ⅛" |
| 1.500" | ⅛" |
| 1.750" | ⅛" |
| 2.000" | ⅛" |
| 2.500" | ⅛" |
| 2.750" | ⅛" |
| 3.000" | 3/16" |
| 3.500" | 3/16" |
| 4.000" | 3/16" |
| 4.500" | 3/16" |
| 5.000" and up | ¼" |

The cooling fluid circulated through chamber 42 is water piped from a regular supply line. FIG. 1 shows a water inlet pipe 48 that communicates with the inlet ports 44 and an equivalent passageway 50 in pump housing 24a that communicates with outlet port 46. Inlet pipe 48 communicates with the water supply line (not shown). Outlet pipe 50 is fitted with a throttle valve 52 that can be adjusted to vary the pressure and flow rate of the water through chamber 42.

In this example, the water line pressure in the mill is about 125 psi, the pressure in chamber 42 is in the range 20–30 psi and the flow rate 5–10 gallons (imperial) per minute. Appropriate gauges may be provided to monitor the pressure and flow rate, However, it has been found in practical tests that the throttle valve can simply be closed to an extent to provide what appears to the operator to be a reasonable flow of water from the throttle valve. If leakage is noted through the seal cartridge, the operator can increase the pressure in chamber 42 by progressively closing the throttle valve until leakage is reduced to an acceptable level, typically zero.

In some situations, it may be desirable to provide an additional throttle valve (not shown) on inlet pipe 48 so that the flow of water entering chamber 42 can be restricted at the outset and only increased progressively if leakage is detected.

While not wishing to be bound by theory, it is believed that the act of circulating water under pressure through chamber 42 serves to both deform the O-rings to ensure good sealing against sleeve 40, and to cool and lubricate the sealing surfaces to prevent abrasion degradation of the O-rings.

It may be that cooling liquids other than water could be used to advantage, for example, in other environments or that gases might be suitable. The particular pressures and flow rates used may also vary depending on the environment.

Figure 2:
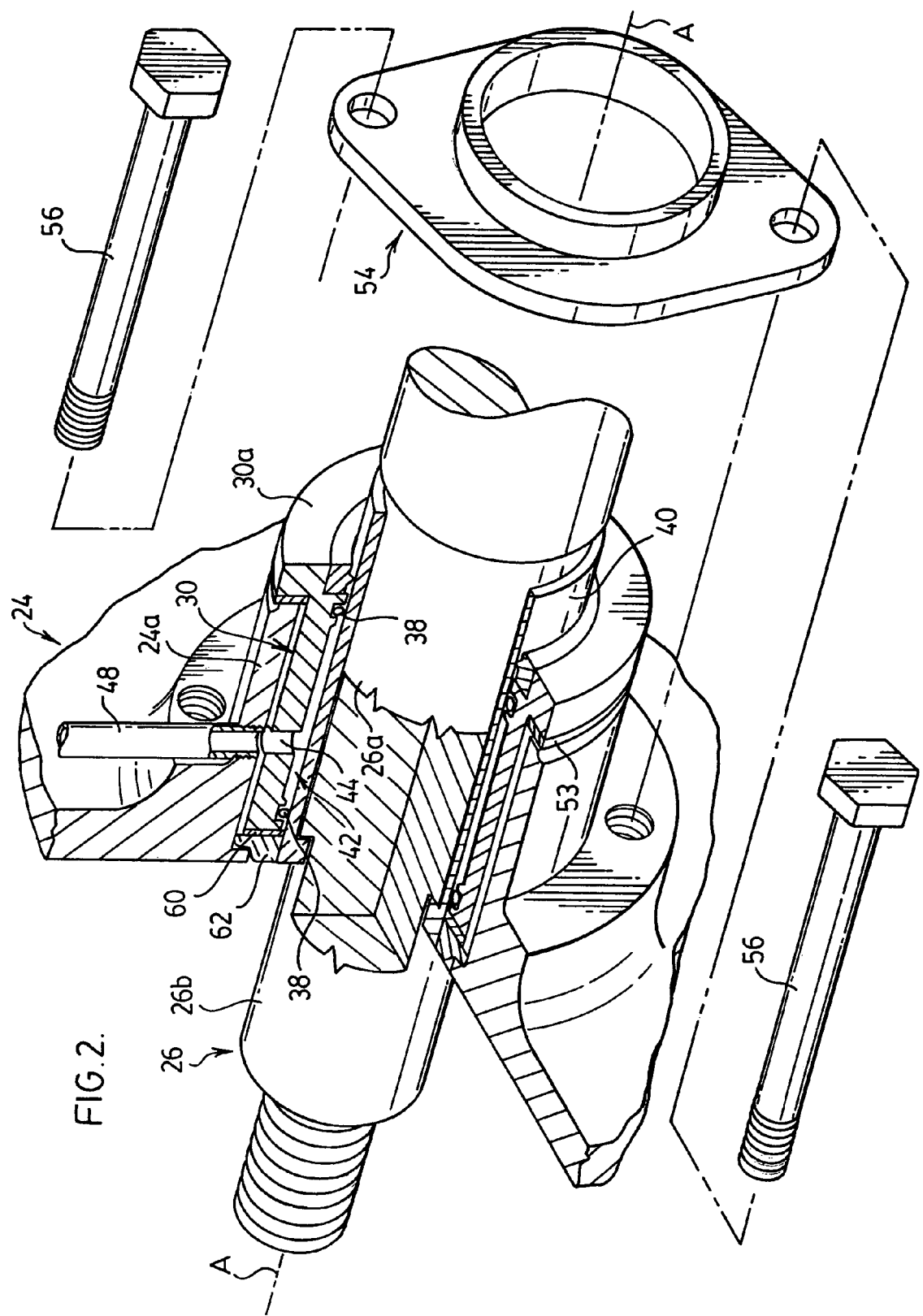
FIG. 2 is an exploded perspective view of the seal shown in FIG. 1.

Constructional details for the seal cartridge itself and its mounting in the pump housing can of course vary. Referring to FIGS. 1 and 3, it will be seen that the seal housing 30 includes an external flange 30a that abuts an end face of the pump casing extension 24a with the intermediary of a gasket 53. A conventional pump packing gland 54 is reversed compared with its normal orientation in a packing application and used to hold the cartridge in place via bolts 56 (see FIG. 2) that are threaded into the pump casing 24.

Radially inwardly of flange 30a (see FIG. 1) is a conventional lip seal 58 that also runs in contact with sleeve 40. At the inner end of housing 30 opposite flange 30a is a plain annular surface that abuts against a further gasket 60 that in turn seats against a throat bushing 62 in the pump casing 24. Bolts 56 are tightened sufficiently to compress gaskets 53 and 60.

In practical tests, the seal cartridge provided by the invention has been found to operate with great reliability for extended periods of time even in harsh environments. For example, the seal has operated satisfactorily (no visible degradation) for one thousand hours at 3,600 rpm on an acid pump in a paper mill. If and when replacement is required, it is simply necessary to remove the impeller 22 from the drive shaft, withdraw the drive shaft, remove gland 54 and then withdraw the cartridge housing 30 from the pump casing 24. Normally, all that is required is to replace the O-rings 38 and then re-assemble the pump in the reverse fashion. Replacement cost has been estimated at approximately 70% of the cost of replacing a typical mechanical seal. Initial set-up has been estimated at about 35% of the cost to set up a conventional mechanical seal.

Referring to the range of shaft sizes given previously (1.25 inches to 5.00 inches) and the rotational speed of 3,600 rpm, the following linear speeds can be calculated for the surface of the shaft:

| Shaft Size (inches) | πd (inches) | Linear Speed @ 3600 rpm (ft/min) |
| --- | --- | --- |
| 1.25 ↓ 5.00 | 3.93 ↓ 15.71 | 1,179 ↓ 4,713 |

It will of course be appreciated that the preceding description relates to particular preferred embodiment of the invention and that many modifications are possible, some of which are indicated herein and others of which will be apparent to a person skilled in the art. In particular, it should be noted that, while the invention has been devised in the context of centrifugal pumps, the seal provided by the invention has wide application to sealing of rotating shafts in many other environments.

I claim:

1. A seal assembly for a rotary shaft having a surface speed higher than 200 ft/min. the seal assembly comprising: a housing having a generally cylindrical internal surface receiving the shaft, said internal surface including first and second internal annular grooves spaced longitudinally of and encircling said internal surface; an O-ring disposed in each groove and in contact with the external surface of the shaft and against which the shaft rotates in use; inlet and outlet ports for a cooling fluid extending through the housing into said generally cylindrical internal surface of the housing at locations spaced angularly about the housing and between said O-rings, whereby an annular chamber is defined between the shaft and the housing intermediate the two O-rings, through which a cooling fluid is circulated in use via said ports; and means for creating a positive cooling fluid pressure within said chamber; the O-rings being deformable under said pressure to seal against the rotary shaft.

2. A seal assembly as claimed in claim 1, wherein said generally cylindrical internal surface of the housing is enlarged radially outwardly in the area of said annular chamber as compared with the diameter of the surface outwardly of said grooves.

3. A seal assembly as claimed in claim 1, wherein said external surface of the shaft is defined by a replaceable sleeve which is received within said generally cylindrical internal surface of the seal housing in contact with said O-rings.

4. A seal assembly as claimed in claim 1 in combination with a conventional centrifugal pump, wherein said housing has a generally cylindrical external surface and is dimensioned to be received in a seal housing of said pump.

5. A seal assembly as claimed in claim 4, wherein said housing includes an outwardly projecting annular flange at an outer end of the housing, the flange having an inner surface provided with a gasket for sealing against a corresponding face of said seal housing.

6. A seal assembly as claimed in claim 5, wherein said cylindrical housing has an annular end face at an end of the housing remote from the flange, said face being provided with a gasket for sealing internally within the seal housing.

7. A seal assembly as claimed in claim 5, further comprising an annular lip seal extending inwardly of the housing at the location of said flange.

8. A seal assembly as claimed in claim 1, wherein said fluid inlet and outlet ports are disposed generally in diametrally opposed locations around said housing for communication respectively with a supply of said fluid and a throttle valve which is operable to control fluid flow from said outlet port, said throttle valve comprising said means for producing a positive cooling fluid pressure within said chamber.

9. A method of sealing a rotary shaft against fluid leakage along the shaft, wherein the shaft rotates at a surface speed higher than 200 ft/min and wherein the method comprises the steps of:
    providing a seal assembly comprising: a housing having a generally cylindrical internal surface which receives the shaft and which includes first and second internal annular grooves spaced longitudinally of and encircling the housing; an O-ring disposed in each groove and in contact with the external surface of the shaft and against which the shaft rotates in use; and an annular chamber defined between the shaft and the housing intermediate the two O-rings; and,
    circulating a cooling fluid through said annular chamber under pressure to cause the O-rings to deform and seal against the rotary shaft.

10. A method as claimed in claim 9, wherein said step of circulating a cooling fluid through said annular chamber under pressure comprises introducing fluid into the chamber from an inlet at a supply pressure and conducting fluid from the chamber through an outlet while throttling the flow of fluid to provide a desired fluid pressure within the chamber.

11. A method as claimed in claim 10, comprising the further step of monitoring leakage along the shaft and, in the event that leakage is detected, reducing the flow of fluid from said outlet so as to increase pressure within the chamber.

12. A method as claimed in claim 9, wherein the fluid circulated through the chamber is water and the pressure in the chamber is in the range 20–30 psi.

13. A method as claimed in claim 12, wherein the water is circulated through the chamber at a flow rate of 5 to 10 imperial gallons per minute.

14. A method of sealing a rotary drive shaft of a centrifugal pump against fluid leakage along the shaft, the method comprising the steps of:
    providing a seal assembly comprising: a housing having a generally cylindrical internal surface which receives the shaft and which includes first and second internal annular grooves spaced longitudinally of and encircling the housing; an O-ring disposed in each groove and in contact with the external surface of the shaft and against which the shaft rotates in use; and an annular chamber defined between the shaft and the housing intermediate the two O-rings;

rotating said shaft at a linear surface speed in a range from 200 ft/min to 4,713 ft/min; and, circulating a cooling fluid through said annular chamber under pressure to cause the O-rings to deform and seal against the rotary shaft.

* * * * *